United States Patent [19]

Ryles et al.

[11] Patent Number: 5,171,808
[45] Date of Patent: Dec. 15, 1992

[54] CROSS-LINKED ANIONIC AND AMPHOTERIC POLYMERIC MICROPARTICLES

[75] Inventors: Roderick G. Ryles, Milford; Dan S. Honig, New Canaan; Elieth W. Harris, Bridgeport; Roger E. Neff, Stamford, all of Conn.

[73] Assignee: American Cyanamid Company, Stamford, Conn.

[21] Appl. No.: 803,120

[22] Filed: Jul. 22, 1991

Related U.S. Application Data

[63] Continuation of Ser. No. 535,626, Jun. 11, 1990, abandoned.

[51] Int. Cl.⁵ .................. C08F 26/10; C08F 20/56; C08F 20/06; C08F 2/24; C08F 8/00
[52] U.S. Cl. .................. 526/264; 526/303.1; 526/317.1; 526/207; 526/213; 525/107; 525/193
[58] Field of Search .......................... 526/264

[56] References Cited

U.S. PATENT DOCUMENTS

| | | | |
|---|---|---|---|
| 4,147,688 | 4/1979 | Makhlouf et al. | 526/273 |
| 4,705,640 | 11/1987 | Whittaker | 524/922 |
| 4,968,435 | 11/1990 | Neff et al. | 524/922 |

OTHER PUBLICATIONS

Susan Budavari, Maryadele J. O'Neil, Ann Smith, and Patricia E. Heckelman, The Merck Index, pp. 21, 935 and 1572, 1989.

Primary Examiner—Joseph L. Schofer
Assistant Examiner—Wu C. Cheng
Attorney, Agent, or Firm—Frank M. Van Riet

[57] ABSTRACT

Novel compositions comprising anionic and/or amphoteric organic polymeric microparticles are disclosed, along with a method for their production. The products are useful in flocculating a wide variety of dispersions of suspended solids and in paper-making.

21 Claims, No Drawings

CROSS-LINKED ANIONIC AND AMPHOTERIC POLYMERIC MICROPARTICLES

This is a continuation of co-pending application Ser. No. 07/535,626, filed Jun. 11, 1990 now abandoned.

The present invention relates to structured anionic and amphoteric polymeric microparticles and a method for their preparation.

BACKGROUND OF THE INVENTION

Cross-linked anionic and amphoteric, organic polymeric compositions are known to those skilled in the art and are useful in a variety of solid-liquid separation applications, particularly in the flocculation of various dispersions of suspended solids, such as sewage sludge, and in the thickening of cellulosic paper pulp suspensions. Modern concerns about environmental pollution and the increasing cost of materials have made it highly desirable to produce flocculating agents which cause higher degrees of separation at lower dosage levels.

EP 0,202,780 describes the preparation of polymeric, crosslinked, cationic acrylamide polymer beads by conventional inverse emulsion polymerization techniques. Crosslinking is accomplished by the incorporation of a difunctional monomer, such as methylenebisacrylamide, into the polymer. This crosslinking technology is well known in the art. The patentee teaches that the crosslinked beads are useful as flocculants.

Typically, the particle size of polymers prepared by conventional inverse water-in-oil emulsion polymerization processes are limited to a range of about 1-5 microns, since no particular advantage in reducing the particle size has hitherto been apparent. The precise particle size which is achievable in inverse emulsions is determined by the concentration and activity of the surfactant(s) employed and these are customarily chosen on the basis of emulsion stability and economic factors.

Leong, et al., in *Inverse Microemulsion Polymerization*, J. of Phys. Chem., Vol. 86, No. 23, Jun. 24, 1982, pp 2271-3, discloses polymerization of acrylamide in an inverse microemulsion. The author, also discloses having prepared crosslinked polyacrylamide latices or microgels by using a 100:1 mixture of acrylamide-methylenebisacrylamide. No anionic or amphoteric monomers are mentioned or is their use as a flocculating agent or paper-making additive.

EPO 0173605 teaches the production of microbeads having a diameter ranging from about 49-87 nm and produced from terpolymers of vinyl acetate (84.6), ethyl acrylate (65.4) and acrylic acid (4.5) or methacrylonitrile (85), butyl acrylate (65) and acrylic acid (3). These polymeric beads are disclosed as added to an LBKP pulp slurry in order to evaluate the resultant paper for sizing degree, paper force enhancement and disintegratability. These polymer beads fall outside the scope of those claimed in the present invention in that the ionic content thereof is too small to impart any appreciable improvement during usage.

Additionally, U.S. Pat. No. 4,681,912 discloses the production of microparticles of acrylamide and acrylic acid, for example, utilizing a microemulsion process. The patent, however, fails to teach the cross-linking of the particles so as to render them water-insoluble or their use in paper-making.

SUMMARY OF THE INVENTION

According to the present invention, there are provided compositions comprising crosslinked, anionic and/or amphoteric, organic, polymeric, microparticles, having an unswollen number average particle size diameter of less than about 0.75 micron, preferably less than about 0.5 micron, a solution viscosity of at least 1.1, preferably from about 1.1 to about 2.0, mPa.s, a crosslinking agent content of above about 4 molar parts per million, based on the monomeric units present in the polymer, and an ionicity of at least about 5%.

The preferred anionic monomers for use in the practice of the present invention comprises acrylic acid, methacrylic acid, ethacrylic acid, 2-acrylamido-2-alkylsulfonic acids where the alkyl group contains 1 to 6 carbon atoms, such as 2-acrylamido-2-propane-sulfonic acid or mixtures of any of the foregoing and their alkaline salts. Especially preferred are the sodium salts of acrylic acid, methacrylic acid, and 2-acrylamido-2-methylpropane sulfonic acid.

The preferred amphoteric polymers for the use in the practice of the present invention comprise copolymers of one or more of the foregoing anionic monomers and one or more of the following cationic ethylenically unsaturated monomers selected from, from example, acryloxyethyltrimethylammonium chloride; diallydimethylammonium chloride; 3-(meth)acrylamidopropyltrimethylammonium chloride; 3-acrylamidopropyltrimethylammonium-2-hydroxypropylacrylate methosulfate; trimethylammoniumethyl methacrylate methosulfate; 1-trimethylammonium-2-hydroxypropylmethacrylate methosulfate; methacryloxyethyltrimethylammonium chloride; or mixtures of any of the foregoing.

The preferred ethylenically unsaturated non-ionic monomers for use in the practice of the present invention are selected from acrylamide; methacrylamide; N,N-dialkylacrylamides; N-alkylacrylamides; N-vinyl-methacetamide; N-vinyl methylformamide; N-vinyl pyrrolidone and mixtures thereof. Especially preferred is acrylamide.

The preferred compositions encompassed by the present invention are 1) anionic monomers alone or 2) a mixture of anionic and cationic monomers, each copolymerized with the ethylenically unsaturated non-ionic monomers disclosed above. Especially preferred is acrylamide copolymerized with sodium acrylate.

Also, according to the present invention, there is provided a process for the preparation of compositions as defined above, the process comprising:

(a) admixing
   (i) an aqueous solution comprising at least one ethylenically unsaturated anionic monomer alone or in admixture with a cationic monomer and at least one crosslinking agent and, optionally, at least one ethylenically unsaturated non-ionic monomer;
   (ii) an oily phase comprising at least one hydrocarbon liquid; and
   (iii) an effective amount of surfactant or surfactant mixture, so as to form an inverse emulsion which, when subjected to polymerization conditions, results in a polymer having a particle size of less than about 0.75 micron in unswollen diameter; and (b) subjecting the inverse emulsion obtained in step (a) to polymerization conditions.

A preferred feature of the present invention, comprises a process employing an aqueous solution comprising sodium acrylate as the anionic monomer, N,N-methylenebisacrylamide as the crosslinking agent and acrylamide as the non-ionic monomer; an oily phase comprising a saturated hydrocarbon; and an effective amount of a surfactant mixture comprising polyoxyethylene (20) sorbitan monooleate and polyoxyethylene sorbitol hexaoleate, sufficient to produce particles of less than about 0.75 micron in unswollen number average particle size diameter.

Polymerization of the inverse emulsion may be carried out by adding a polymerization initiator, such as sodium metabisulfite or tert-butyl hydroperoxide, or by subjecting the inverse emulsion to ultraviolet irradiation. Also contemplated by the present invention is adding an effective amount of chain-transfer agent to the aqueous solution of the inverse emulsion, such as an alcohol, mercaptan, phosphite, sulfite or mixture of any of the foregoing. The process of the present invention may also comprise a step for recovering the composition from the inverse emulsion.

The resultant organic polymeric particles are useful in a method of making paper from an aqueous suspension of cellulose fibers, whereby the drainage properties of the suspension are improved by including in the suspension 0.1 to 20 lbs/ton, based on the dry weight of paper furnish solids, of the anionic or amphoteric cross-linked organic polymer microbead having an unswollen number average particle size diameter of less than about 0.75 micron, a solution viscosity of at least about 1.1, preferably about 1.1 to about 2.0 mPa.s, a cross-linking agent content of above about 4 molar parts per million, based on the monomeric units present in the polymer, and at least 5% ionicity, preferably in the presence of a molecular weight Ser. No. 07/536,382 filed Jun. 11, 1990, now abandoned and refiled as Ser. No. 07/540,667, filed Jun. 18, 1990 as a continuation-in-part.

DETAILED DESCRIPTION OF THE INVENTION

Cross-linked, anionic or amphoteric, organic polymeric microbeads having an unswollen number average particle size diameter of less than about 0.75 micron, a solution viscosity of from about 1.1 to about 1.5 mPa.s, a crosslinking agent content of above about 4 molar parts per million, based on the monomeric units present in the polymer, and an ionicity of at least about 5 mole percent, are generally formed by the polymerization of at least 5% of an ethylenically unsaturated anionic monomer and, for amphoteric microparticles, at least about 5% of one cationic monomer, and, optionally at least one non-ionic comonomer in the presence of a cross-linking agent in a water-in-oil inverse emulsion employing an effective amount of surfactant or surfactant mixture to produce microbeads of less than about 0.75 micron.

The amphoteric polymers for the use in the practice of the present invention comprise copolymers of one or more of the foregoing anionic monomers and one or more of the following cationic ethylenically unsaturated monomers (meth)acrylates of dialkylaminoalkyl compounds, and salts and quaternaries thereof and in particular monomers of N,N-dialkylaminoalkyl(meth)acrylamides, and salts and quaternaries thereof, such as N,N-dimethylaminoethyacrylamides; and the acid or quaternary salts thereof and the like. Cationic monomers which may be used herein are of the following general formulae:

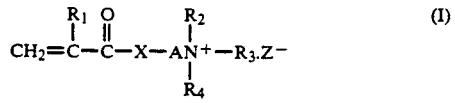

where $R_1$ is hydrogen or methyl, $R_2$ is hydrogen or lower alkyl of 1-4 carbon atoms, $R_3$ and/or $R_4$ are hydrogen, alkyl of 1-12 carbon atoms, aryl, or hydroxyethyl and $R_2$ and $R_3$, or $R_3$ and $R_4$, can combine to form a cyclic ring containing one or more hetero atoms, and Z is the conjugate base of an acid; X is oxygen or $-NR_1$, wherein $R_1$ is as defined above, and A is an alkylene group of 1-12 carbon atoms, or

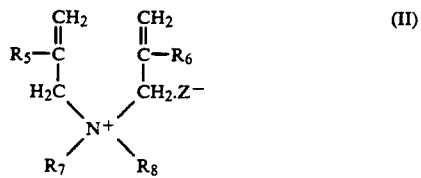

where $R_5$ and $R_6$ are hydrogen or methyl, $R_7$ is hydrogen or alkyl of 1-12 carbon atoms, and $R_8$ is hydrogen, alkyl of 1-12 carbon atoms, benzyl or hydroxyethyl; and Z is as defined above.

These ethylenically unsaturated anionic, cationic and non-ionic monomers may be copolymerized to produce anionic and amphoteric copolymers. Preferably, acrylamide is copolymerized with a anionic monomer. Anionic copolymers useful in the practice of this invention comprise from about 0 to about 95 parts, by weight of non-ionic monomer and about 5 to about 100 parts, by weight, of anionic monomer, based on the total polymer weight. Amphoteric polymers may be produced from about 1-99 parts, by weight, same basis, of anionic monomer and from about 99-1 parts, by weight, of cationic monomer, optionally with from about 0-75 parts, by weight, of a non-ionic monomer, the total weight of the anionic monomer and cationic monomer being at least 5%. Polymerization of the monomers is conducted in the presence of a polyfunctional crosslinking agent to form the crosslinked composition. The polyfunctional crosslinking agent comprises molecules having either at least two double bonds, a double bond and a reactive group, or two reactive groups. Illustrative of those containing at least two double bonds are N,N-methylenebisacrylamide, N,N-methylenebismethacrylamide, polyethyleneglycol diacrylate, polyethyleneglycol dimethacrylate, N-vinyl acrylamide, divinylbenzene, triallylammonium salts, N-methylallylacrylamide and the like. Polyfunctional branching agents containing at least one double bond and at least one reactive group include, glycidyl acrylate, acrolein, methylolacrylamide and the like. Polyfunctional branching agents containing at least two reactive groups include aldehydes such as glyoxal, diepoxy compounds, epichlorohydrin and the like.

Crosslinking agents are to be used in sufficient quantities to assure a crosslinked composition. Preferably at least about 4 molar parts per million of crosslinking agent, based on the monomeric units present, are employed to induce sufficient crosslinking and preferred is a crosslinking agent content of from about 4 to about 6000 molar parts per million, more preferably about 20–4000 and most preferably about 50–2000 molar parts per million.

One method of obtaining the polymeric microparticles of this invention is to polymerize the monomers in a microemulsion. Polymerization in microemulsions and inverse microemulsions is known to those skilled in this art. P. Speiser reported in 1976 and 1977 a process for making spherical "nanoparticles" with diameters less than 800A by (1) solubilization of polymerizable molecules, e.g. acrylamide and methylenebisacrylamide and other materials, e.g drugs, in micelles and (2) polymerizing the monomers in the micellês. J. Pharm. Sa., 65(12), 1763 (1976) and U.S. Pat. No. 4,021,364. Both inverse water-in-oil and oil-in-water "nanoparticles" were prepared by this process. While not specifically called microemulsion polymerization by the author, this process does contain all the features which are currently used to define microemulsion polymerization. These reports also constitute the first examples of polymerization or acrylamide in a microemulsion. Since then, numerous publications reporting polymerization of hydrophobic polymers in the oil phase of microemulsions have appeared. See, for example, Stoffer and Bone, J. Dispersion Sci. and Tech., 1(1), 37, 1980 and Atik and Thomas, J. Am. Chem. Soc'y, 103(14), 4279 (1981); and GB 2161492A.

The ionic and amphoteric microemulsion polymerization process may be conducted by (i) preparing a monomer microemulsion by adding an aqueous solution of the monomers to a hydrocarbon liquid containing appropriate surfactant or surfactant mixture to form an inverse monomer microemulsion consisting of small aqueous droplets which, when polymerized, result in polymer particles of less than 0.75 micron in size, dispersed in the continuous oil phase and (ii) subjecting the monomer microemulsion to free radical polymerization.

In order to obtain an inverse microemulsion, it is generally necessary to use particular conditions whose main parameters are as follows: surfactant concentration, HLB of surfactant or surfactant mixture, temperature, nature of the organic phase and composition of the aqueous phase.

The aqueous phase comprises an aqueous mixture of the monomers, anionic or a mixture of anionic and cationic and optionally non-ionic, and the crosslinking agent, as defined above. The aqueous monomer mixture may also comprise such conventional additives as are desired. For example, the mixture may contain chelating agents to remove polymerization inhibitors, pH adjusters, initiators and other conventional additives.

Essential to the formation of the microemulsion, which may be defined as a swollen, transparent and thermodynamically stable micelle solution without agitation, comprising two liquids insoluble in each other and a surfactant, in which the micelles are much smaller than in an emulsion, is the selection of appropriate organic phase and surfactant.

The selection of the organic phase has a substantial effect on the minimum surfactant concentration necessary to obtain the inverse microemulsion. This organic phase may comprise of a hydrocarbon or hydrocarbon mixture. Saturated hydrocarbons or mixtures thereof are the most suitable in order to obtain inexpensive formulations (lower surfactant content) of inverse microemulsions. Typically, the organic phase will comprise benzene, toluene, fuel oil, kerosene, odorless mineral spirits and mixtures of any of the foregoing.

The ratio by weight of the amounts of aqueous and hydrocarbon phases is chosen as high as possible, so as to obtain, after polymerization, a microemulsion of high polymer content. Practically, this ratio may range, for example from about 0.5 to about 3:1, and usually is about 2:1.

The one or more surfactants are selected in order to obtain an HLB (Hydrophilic Lipophilic Balance) value ranging from about 8 to about 11. In addition to the appropriate HLB value, the concentration of surfactant must also be optimized, i.e. sufficient to form an inverse emulsion having the correct particle size. Typical surfactants useful in the practice of this invention, in addition to those specifically discussed above, may be anionic, cationic or non-ionic and are selected from polyoxyethylene (20) sorbitan trioleate, sorbitan trioleate, sodium di-2-ethylhexylsulfosuccinate, oleamidopropyldimethylamine; sodium isostearyl-2-lactate and the like.

Polymerization of the emulsion may be carried out in any manner known to those skilled in the art. Initiation may be effected with a variety of thermal and redox free-radical initiators including azo compounds, such as azobisisobutyronitrile; peroxides, such as t-butyl peroxide; organic compounds, such as potassium persulfate and redox couples, such as ferrous ammonium sulfate/ammonium persulfate. Polymerization may also be effected by photochemical irradiation processes, irradiation, or by ionizing radiation with a 60 Co source. Preparation of an aqueous product from the emulsion may be effected by inversion by adding it to water which may contain a breaker surfactant. Optionally, the polymer may be recovered from the emulsion by stripping or by adding the emulsion to a solvent which precipitates the polymer, e.g. isopropanol, filtering off the resultant solids, drying and redispersing in water.

The product of this invention is useful in facilitating a wide range of solid-liquid separation operations. The products of this invention may be used to dewater biologically treated suspensions, such as sewage and other municipal or industrial sludges; the drainage of cellulosic suspension, such as those found in paper production, e.g. paper waste; and the settling and dewatering of various inorganic suspensions, e.g. refinery waste, coal waste, etc.

DESCRIPTION OF THE PREFERRED EMBODIMENTS

The following examples illustrate the present invention. They are not be construed as limitations on the present invention except as set forth in the appended claims.

EXAMPLES 1–5

Procedure for the Preparation of Anionic Microemulsion

The master batch of aqueous phase is made by mixing acrylic acid (AA), as the sodium salt, 200 parts deionized water, 56.5% sodium hydroxide, crystal acrylamide (AMD), 0.3 part 10% pentasodium diethylenetriaminepentaacetate, 39.0 parts additional deionized water, and 1.5 parts of 0.518% copper sulfate pentahydrate together. To 110.2 parts of this aqueous phase solution, 6.5 parts deionized water, 0.25 part 1% t-butyl hydroperoxide and N,N-methylene bisacrylamide (MBA) are added. This aqueous phase is mixed with an oil phase containing 77.8 parts of low odor paraffin oil, 3.6 parts sorbitan sesquioleate and 21.4 parts polyoxyethylene sorbitol hexaoleate.

This emulsion is deaerated with nitrogen for 20 minutes. The polymerization is then initiated with gaseous $SO_2$. The polymerization is then allowed to exotherm to 40° C. and is controlled at 40° C. (+5° C.) with ice water. The ice water is removed when cooling is no longer required. The nitrogen is continued for one hours. The total polymerization time is 2.5 hours.

If desired, the polymer may be recovered from the emulsion by stripping or by adding the emulsion to a solvent which precipitates the polymer, e.g. isopropanol, filtering off the resultant solids, drying and redispersing in water.

At the time of use e.g. as a paper-making additive, the recovered polymer may be dispersed in water. The emulsion, microbeads may also be directly dispersed in water. Depending on the surfactant and levels used in the emulsion dispersion may require using high a hydrophilic lipophilic balance (HLB) inverting surfactant such as an ethoxylated alcohol; polyoxyethyllated sorbitol hexaoleate; diethanolamine oleate; ethoxylated laurel sulfate etc. as in known in the art.

The procedure for preparing amphoteric emulsions e.g. 15AA/60AMD/25 dimethylaminoethylacrylate (DMEA)/349 ppm MBA, is repeated for the preparation of the anionic emulsions with the exception that the concentration of the individual monomers employed are adjusted accordingly.

Various monomers are polymerized in accordance with the above procedure. The results are set forth in Table I, below.

TABLE I

Preparation of Anionic Microbeads

| Example | Copolymer Compositions (Mole %) | | | MBA PPM | PS NM | SV mPa · S |
|---|---|---|---|---|---|---|
| | AMD | AA | NaAPS | | | |
| 1 | 70 | 30 | — | 349 | 130 | 1.19 |
| 2 | 40 | 60 | — | 1381 | 120 | 1.10 |
| 3 | 0 | 100 | — | 1985 | 80 | 1.35 |
| 4 | 70 | — | 30 | 995 | — | 1.37 |
| 5 | 70 | — | 30 | 10,086 | — | 1.15 |
| 6 | 70 | 30 | — | 1000 | 464 | — |
| 7 | 70 | 30 | — | 1000 | 149 | 1.02 |
| 8 | 70 | 30 | — | 1000 | 106 | 1.06 |

NaAPS = Sodium 2-Acrylamido-2-methylpropane Sulfonic Acid
PS = Number Average Particle Size in Nanometers
SV = Solution Viscosity (0.1% polymer in M NaCl, 25° C. using a Brookfield UL adapter at 60 rpm

EXAMPLE 9

In paper making processes it is found that the addition of anionic microbeads, preferably with a high molecular weight cationic polymer to a conventional paper making stock increases the drainage rate of water from the paper. The following examples illustrate this utility but are not to be construed to limit the invention in any manner whatsoever.

A 70/30 hardwood/softwood bleached kraft pulp is used containing 25% $CaCO_3$ for alkaline papermaking at a pH of 8.0 Drainage is a measure of the time required for a certain volume of water to drain through the paper and is here measured as a10X drainage. (K. Britt, TAPPI 63(4) p67 (1980). Hand sheet are prepared on a Noble and Wood sheet machine. In the test examples, the linear cationic copolymer is a 10 mole % of acryloxyethyltrimethylammonium chloride (AETMAC) and 90 mole % of acrylamide (AMD) of 5,000,000 to 10,000,000 mol. wt. with a charge density of 1.2 meg./g.

and SV-4.0 cps. The anionic microbeads in Table II are added separately to the thin paper stock. The cationic polymer is added to the test furnish in a "Vaned Britt Jar" and subjected to 800 rpm stirring for 30 seconds. The anionic microbead is then added and subjected to 800 rpm stirring for 30 seconds and then drainage times are measured. The results of testing are set forth in Table II, below.

TABLE II

Drainage Aid Test Data

| Example | Cationic Polymer | Dosage (lb/ton) | Anionic Polymer Microbead of Example No. | Dosage (lb/ton) | Drainage Time (Sec) |
|---|---|---|---|---|---|
| 6 | -0- | | — | | 161.1 |
| 7 | 10 AETMAC/ 90 AMD | 2 | | | 116.9 |
| 8 | 10 AETMAC/ 90 AMD | 2 | -1- | (0.5) | 75.8 |
| 9 | 10 AETMAC/ 90 AMD | 2 | -1- | (1.0) | 72.1 |
| 10 | 10 AETMAC/ 90 AMD | 2 | -1- | (2.0) | 84.3 |
| 11 | 10 AETMAC/ 90 AMD | 2 | -2- | (0.5) | 66.3 |
| 12 | 10 AETMAC/ 90 AMD | 2 | -2- | (1.0) | 72.4 |
| 13 | 10 AETMAC/ 90 AMD | 2 | -2- | (2.0) | 74.7 |
| 14 | 10 AETMAC/ 90 AMD | 2 | -3- | (0.5) | 78.8 |
| 15 | 10 AETMAC/ 90 AMD | 2 | -3- | (1.0) | 74.1 |
| 16 | 10 AETMAC/ 90 AMD | 2 | -3- | (2.0) | 80.2 |
| 17 | 10 AETMAC/ 90 AMD | 2 | -4- | (0.5) | 95.0 |
| 18 | 10 AETMAC/ 90 AMD | 2 | -4- | (1.0) | 86.6 |
| 19 | 10 AETMAC/ 90 AMD | 2 | -4- | (2.0) | 95.5 |
| 20 | 10 AETMAC/ 90 AMD | 2 | -5- | (0.5) | 119.7 |
| 21 | 10 AETMAC/ 90 AMD | 2 | -5- | (1.0) | 121.8 |
| 22 | 10 AETMAC/ 90 AMD | 2 | -5- | (2.0) | 111.4 |

The drainage time for the untreated alkaline paper stock is 161.1 seconds. Addition of the linear, cationic polymer, 10 AETMAC/90 AMD, at a level of 2 lbs/ton decreases the drainage time to 116.9. Further decreases in drainage time are obtained by the joint addition of the anionic microbeads of this invention of doses of 0,5, 1.0 and 2.0 lbs/ton with the 2 lbs/ton of the cationic polymer. The microbead 70 AMD/30 Na AMPS/10,086 ppm MBA has little effect on drainage due to the excessively high degree of cross-linking and is outside the scope of this invention. The higher degree anionicity of 2 microbeads (40 AMD/60 AA/1381 ppm MBA-120nm and 100AA/1985 ppm MBA-80 nm) improves drainage time over those of the lower degree of anionicity microbeads 70 AMD/30 NaAPS/995 ppm MBA. The 1.0 lb/ton dosage of anionic microbead gives better drainage times than either the 0.5 or 2.0 lbs/ton dosage. The only exception is with the microbead 40AMD/60 AA/1,381 ppm MBA where the 0.5 lb/ton dosage is the most desirable.

EXAMPLES 23–27

Anionic microbeads of 5 and 10 mole percent of anionic charge and amphoteric microbeads with a 5 mole % higher anionic charge than cationic charge are made by the procedure of Example 1 and are shown in Table III. The microbeads have a particle size under 0.5 micron in Examples 23-27.

TABLE III

| | Preparation of Anionic and Amphoteric Microbeads | | | | | | |
|---|---|---|---|---|---|---|---|
| | Copolymer Compositions (Mole %) | | | | MBA | | |
| Example | AMD | NaAc | NaAPS | DMEA | ppm | PS NM | SV mPa·S |
| 23 | 90 | 10 | — | — | 496 | — | 1.34 |
| 24 | 95 | 5 | — | — | 97 | — | 1.89 |
| 25 | 85 | — | 10 | 5 | 1026 | — | 1.40 |
| 26 | 55 | — | 25 | 20 | 5101 | — | 1.59 |
| 27 | 60 | — | — | 40 | 100 | 100 | — |

DMEA = Acryloxylethyltrimethyl-ammonium Chloride
See Table I for other legends

EXAMPLE 28

The anionic and amphoteric microbeads of Table III are used in the paper making process described in Example 2. The results are substantially the same.

EXAMPLES 29-33

The procedure of Example 1 is again followed except that different monomers are employed in the preparation of the microbead. The results are set forth in Table IV, below.

TABLE IV

| Example | Non-Ionic Monomer (%) | Anionic Monomer (%) | MBA PPM |
|---|---|---|---|
| 29 | AM-50 | MMA-50 | 117 |
| 30 | AM-65 | VSA-35 | 226 |
| 31 | AM-75 | DADM-25 | 198 |
| 32 | — | NaAPS-100 | 316 |
| 33 | MAM-90 | AA-10 | 441 |

MAM = methacrylamide
MMA = methacrylic acid
VSA = vinylsulfonic acid
DADM = diallydimethylammonium chloride The above mentioned patents and publications are incorporated herein by reference.

Many variations of the present invention will suggest themselves to those skilled in this art in light of the above detailed description. Chain-transfer agents may be optionally added to the monomer solution. Also contemplated are all methods of polymerization and dewatering processes.

All such obvious modifications are within the full intended scope of the appended claims.

We claim:

1. A composition comprising cross-linked anionic or amphoteric polymeric microparticles derived solely from the polymerization of an aqueous solution of at least of one monomer, said microparticles having an unswollen number average particle size diameter of less than about 0.75 micron, a solution viscosity of at least about 1.1 mPa.s, a cross-linking agent content of about 4 molar parts to about 4000 parts per million, based on the monomeric units present in the polymer, and an ionicity of at least about 5 mole percent.

2. A composition as defined in claim 1 wherein said crosslinking agent content is from about 20 to about 4,000 molar parts per million.

3. A composition as defined in claim 1 wherein said crosslinking agent content is from about 50 to about 2,000 molar parts per million.

4. A composition as defined in claim 1 wherein said crosslinking agent is a difunctional monomer selected from N,N'-methylenebisacrylamide, N,N'-methylenebismethacrylamide, polyethyleneglycol dimethacrylate, polyethyeneglycol diacrylate, N-vinyl acrylamide, glycidyl acrylate, divinylbenzene, acrolein, glyoxal, diepoxy compounds, epichlorohydrin and mixtures of the foregoing.

5. A composition as defined in claim 4 wherein said crosslinking agent comprises N,N'-methylenebisacrylamide.

6. A composition as defined in claim 1 wherein said said unswollen diameter is less than 0.5 micron.

7. A composition as defined in claim 1 wherein the organic polymer microparticle is composed of at least one ethylenically unsaturated non-ionic monomer.

8. A composition as defined in claim 1 wherein the organic polymer microparticle is composed of at least one anionic monomer selected from acrylic acid, methylacrylic acid, ethylacrylic acid, 2-acrylamido-2-methylpropanesulfonic acid or mixtures or salts thereof.

9. A composition as defined in claim 8 wherein said anionic monomer comprises sodium acrylate, sodium methylacrylate, sodium ethylacrylate or sodium 2-acrylamido-2-methylpropanesulfonate.

10. A composition as defined in claim 1 wherein the organic polymer microparticle is amphoteric and is composed of from 1% to 99% of an anionic monomer selected from acrylic acid, methacrylic acid, ethacrylic acid, 2-acrylamido-2-methylpropane sulfonic acid or salts thereof and from 99% to 1% of a cationic monomer selected from acryloxyethyltrimethylammonium chloride, 3-methyacrylamidopropyltrimethylammonium chloride, diallydimethylammonium chloride and mixtures thereof.

11. A composition as defined in claim 7 wherein said non-ionic ethylenically unsaturated monomer is selected from acrylamide; methacrylamide; N,N-dialkylacrylamides: N-alkylacrylamides; N-vinylmethacetamide; N-vinyl methylformamide; N-vinyl pyrrolidone and mixtures thereof.

12. A composition as defined in claim 1 wherein said organic polymer microbead is composed of sodium acrylate and acrylamide.

13. A process for the preparation of a composition as defined in claim 1, said process comprising:
(a) admixing
(i) an aqueous solution comprising at least one ethylenically unsaturated anionic monomer alone or in admixture with a cationic monomer, and at least one crosslinking agent and, optionally, at least one ethylenically unsaturated non-ionic monomer;
(ii) an oily phase comprising at least one hydrocarbon liquid;
(iii) an effective amount of surfactant or surfactant mixture, so as to form an inverse emulsion; and (b) subjecting the inverse emulsion obtained in step (a) to polymerization conditions.

14. A process as defined in claim 13 wherein said monomer solution of step (a)(i) comprises sodium acrylate as said anionic monomer, N,N-methylenebisacrylamide as said crosslinking agent and acrylamide as said non-ionic monomer.

15. A process as defined in claim 13 wherein said oily phase of step (a)(ii) comprises a saturated hydrocarbon.

16. A process as defined in claim 13 wherein said surfactant or surfactant mixture of step (a)(iii) comprises polyoxythylene sorbitol hexaoleate or a mixture thereof with sorbitan sesquioleate.

17. A process as defined in claim 13 wherein said polymerization conditions of step (b) comprise adding a polymerization initiator.

18. A process as defined in claim 17 wherein said polymerization initiator comprises sodium metabisulfite or tertiary-butyl hydroperoxide.

19. A process as defined in claim 13 wherein said polymerization conditions of step (b) comprise subjecting said inverse emulsion to ultraviolet irradiation.

20. A process as defined in claim 13 wherein said aqueous solution of step (a)(i) additionally contains an effective amount of a chain-transfer agent selected from an alcohol, mercaptan, phosphite, sulfite, or a mixture thereof.

21. A process as defined in claim 13 which also includes step (c), comprising recovering the composition from the emulsion.

* * * * *